United States Patent
Jung et al.

(10) Patent No.: US 10,522,848 B2
(45) Date of Patent: Dec. 31, 2019

(54) SEPARATING PLATE AND FUEL CELL STACK INCLUDING SAME

(71) Applicant: LG CHEM, LTD., Seoul (KR)

(72) Inventors: Hye Mi Jung, Daejeon (KR); Jee Hoon Jeong, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 103 days.

(21) Appl. No.: 15/570,466

(22) PCT Filed: May 26, 2016

(86) PCT No.: PCT/KR2016/005568
§ 371 (c)(1),
(2) Date: Oct. 30, 2017

(87) PCT Pub. No.: WO2016/190673
PCT Pub. Date: Dec. 1, 2016

(65) Prior Publication Data
US 2018/0145345 A1 May 24, 2018

(30) Foreign Application Priority Data
May 27, 2015 (KR) .................. 10-2015-0073872

(51) Int. Cl.
*H01M 8/026* (2016.01)
*H01M 8/0265* (2016.01)
*H01M 8/0267* (2016.01)
*H01M 8/0258* (2016.01)
*H01M 8/1004* (2016.01)
(Continued)

(52) U.S. Cl.
CPC ......... *H01M 8/0258* (2013.01); *H01M 8/026* (2013.01); *H01M 8/0265* (2013.01); *H01M 8/0267* (2013.01); *H01M 8/1004* (2013.01); *H01M 8/241* (2013.01);
(Continued)

(58) Field of Classification Search
None
See application file for complete search history.

(56) References Cited

U.S. PATENT DOCUMENTS

| 2005/0153184 A1 | 7/2005 | Beutel et al. |
| 2006/0003206 A1 | 1/2006 | Sugiura et al. |

(Continued)

FOREIGN PATENT DOCUMENTS

| JP | 10-308227 A | 11/1998 |
| KR | 10-2008-0054114 A | 6/2008 |

(Continued)

OTHER PUBLICATIONS

Extended European Search Report, dated Oct. 1, 2018, for European Application No. 16800312.7.
(Continued)

*Primary Examiner* — Jonathan Crepeau
(74) *Attorney, Agent, or Firm* — Birch, Stewart, Kolasch & Birch, LLP

(57) ABSTRACT

The present invention relates to a separating plate and a fuel cell stack including same. According to an embodiment of the present invention, a separating plate is provided defining a coolant passage capable of uniform coolant supply and heat recovery across all areas of a reaction region, the separating plate can easily regulate the temperature of a reaction surface, and a reduction in performance and durability due to thermal load can be prevented.

19 Claims, 13 Drawing Sheets

(51) Int. Cl.
  *H01M 8/241*   (2016.01)
  *H01M 8/0254*  (2016.01)
  *H01M 8/0297*  (2016.01)
  *H01M 8/1018*  (2016.01)

(52) U.S. Cl.
  CPC ........ *H01M 8/0254* (2013.01); *H01M 8/0297* (2013.01); *H01M 2008/1095* (2013.01)

(56) References Cited

U.S. PATENT DOCUMENTS

| | | |
|---|---|---|
| 2006/0046130 A1 | 3/2006 | Lai |
| 2008/0134496 A1 | 6/2008 | Bae |
| 2014/0342264 A1 | 11/2014 | Fellows et al. |
| 2015/0171436 A1 | 6/2015 | Lee et al. |

FOREIGN PATENT DOCUMENTS

| | | |
|---|---|---|
| KR | 10-2012-0042376 A | 5/2012 |
| KR | 10-1417107 B1 | 7/2014 |
| KR | 10-2015-0017402 A | 2/2015 |
| KR | 10-1491372 B1 | 2/2015 |

OTHER PUBLICATIONS

International Search Report for PCT/KR2016/005568 (PCT/ISA/210) dated Aug. 2, 2016.

[Figure 1]
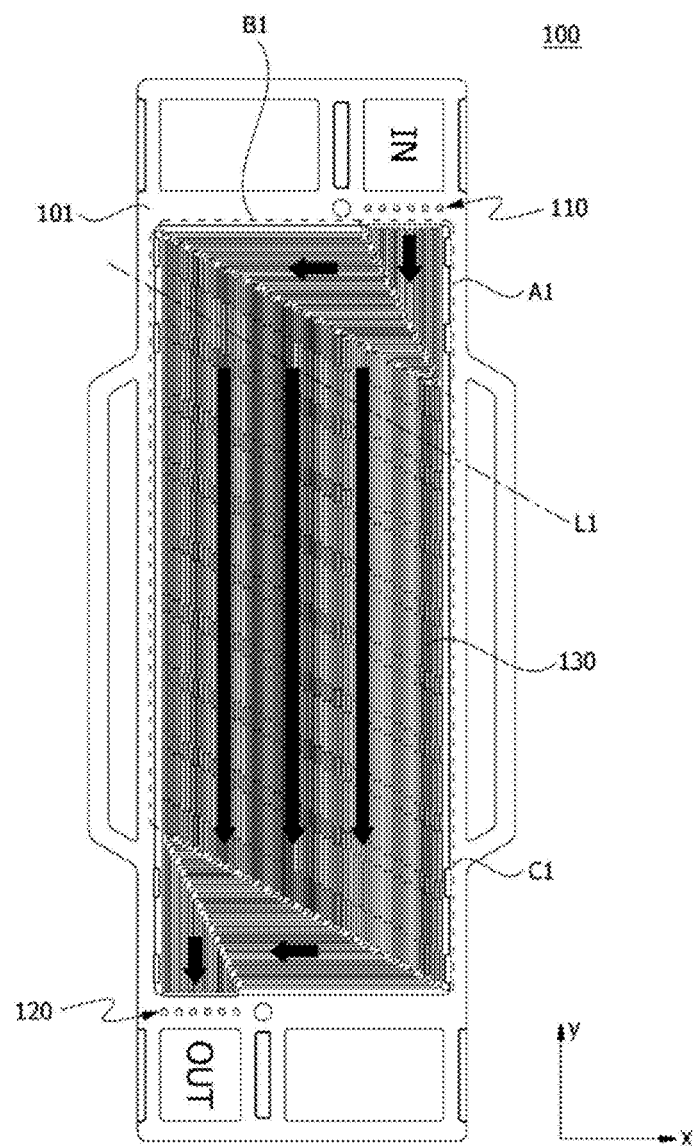

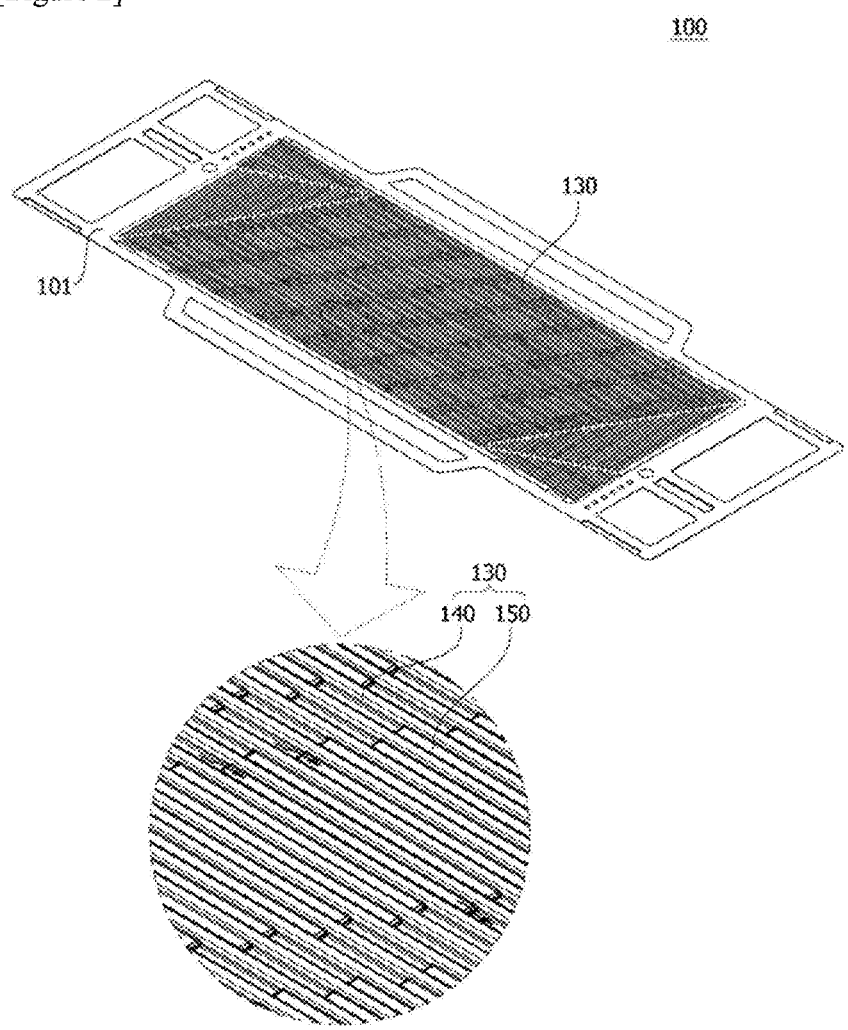
[Figure 2]

[Figure 3]
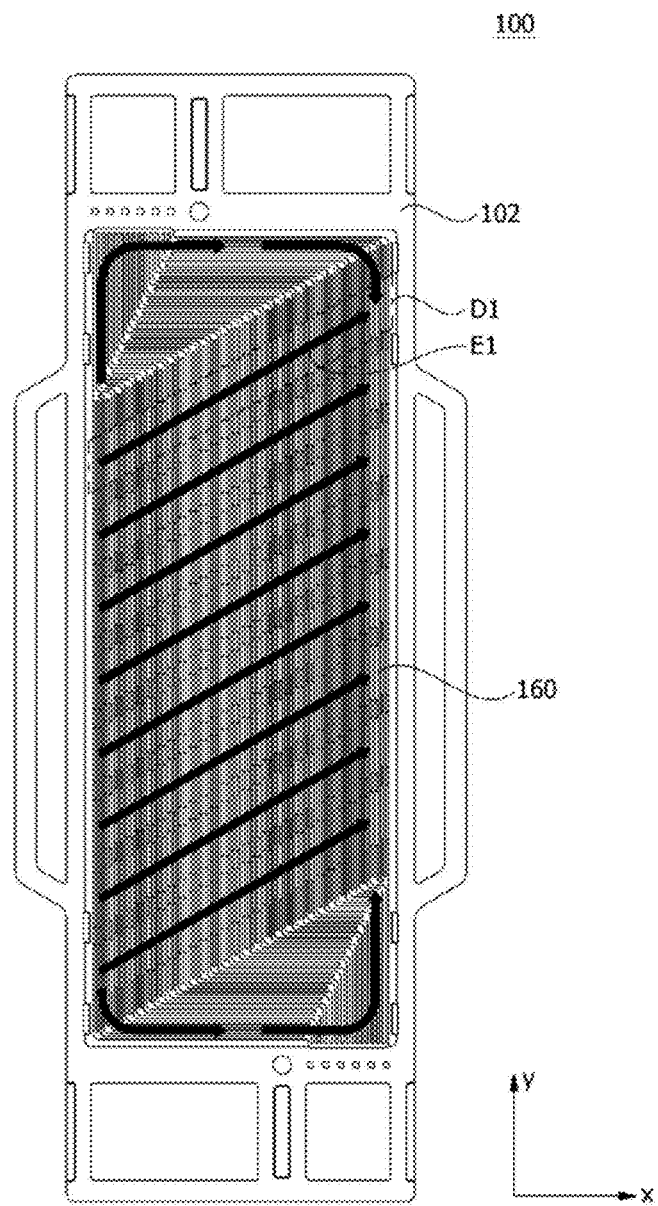

[Figure 4]
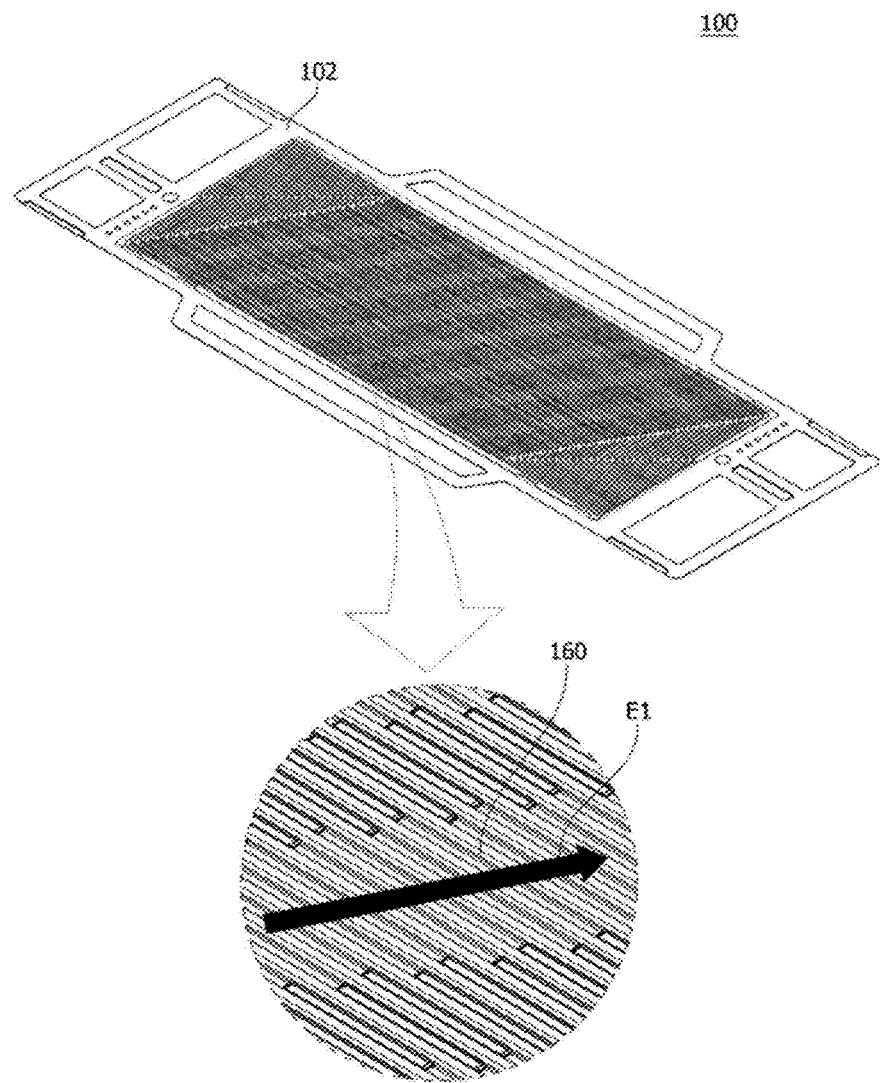

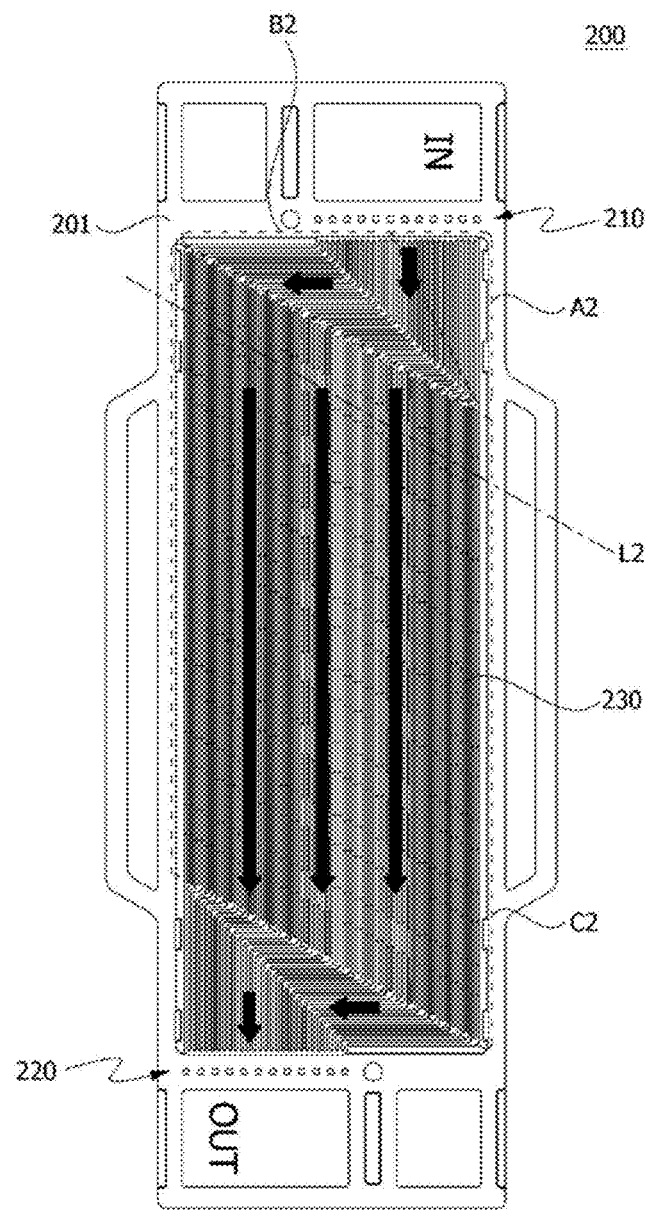
[Figure 5]

[Figure 6]
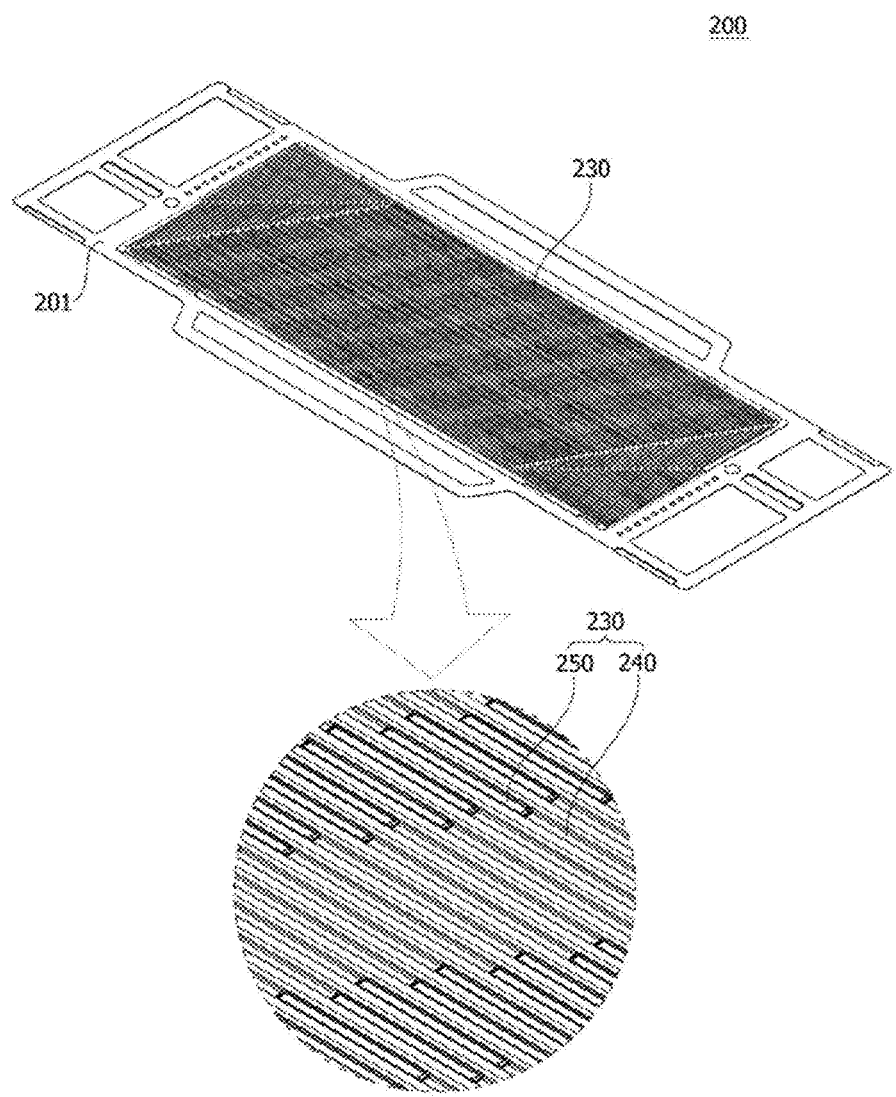

[Figure 7]
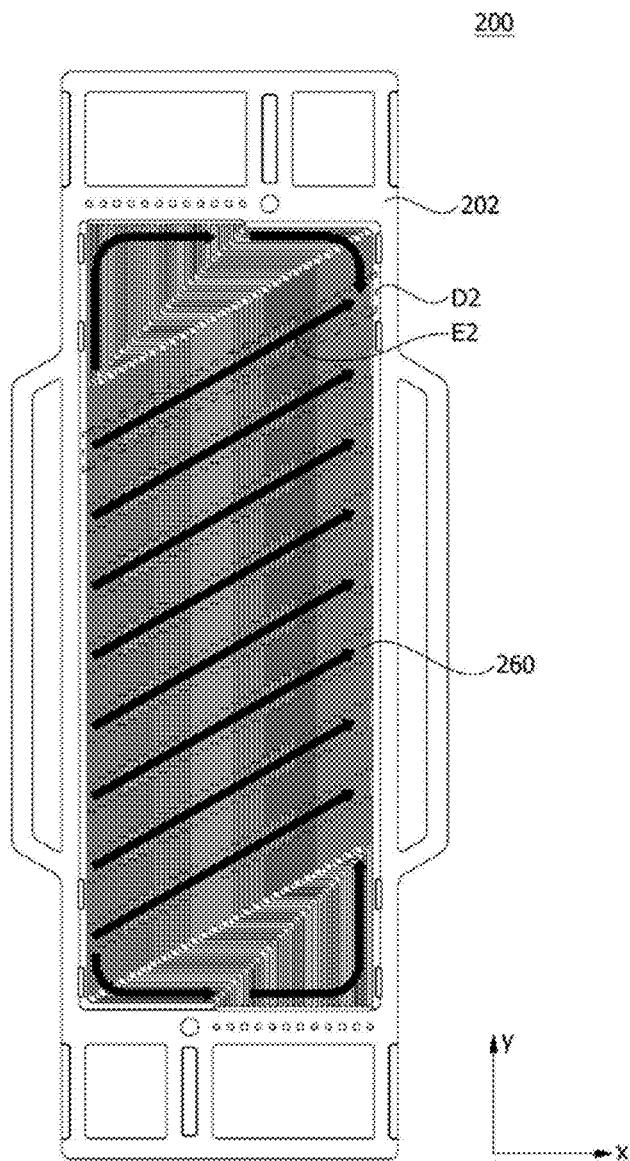

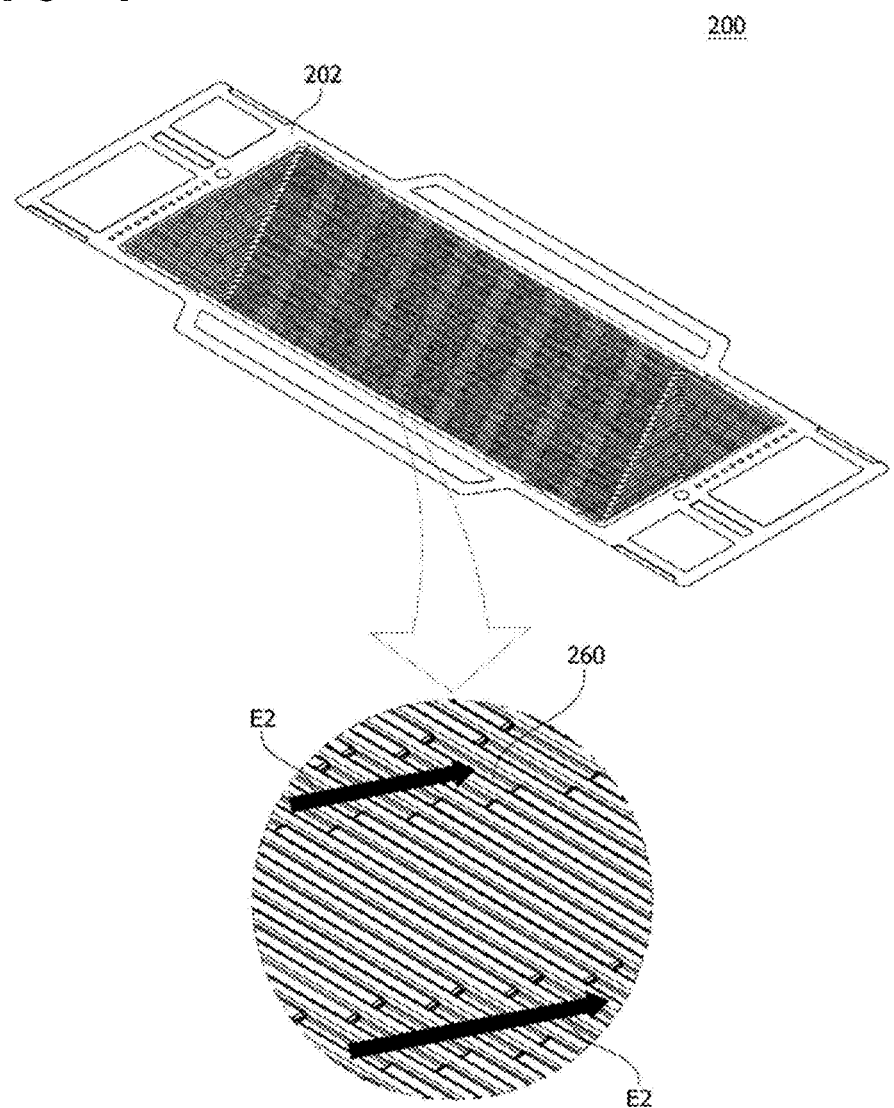
[Figure 8]

[Figure 9]
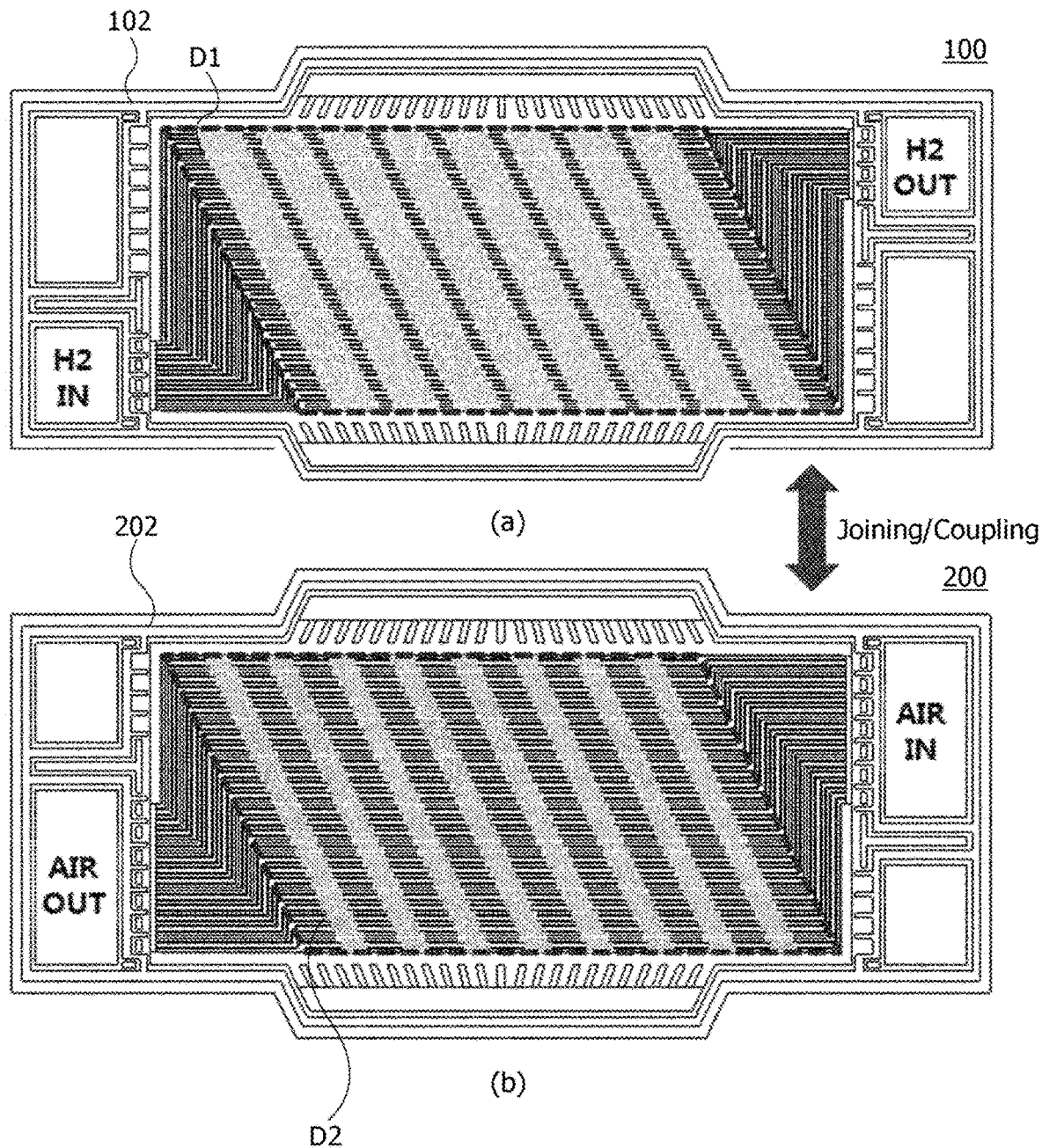
(a)
(b)
Joining/Coupling

[Figure 10]
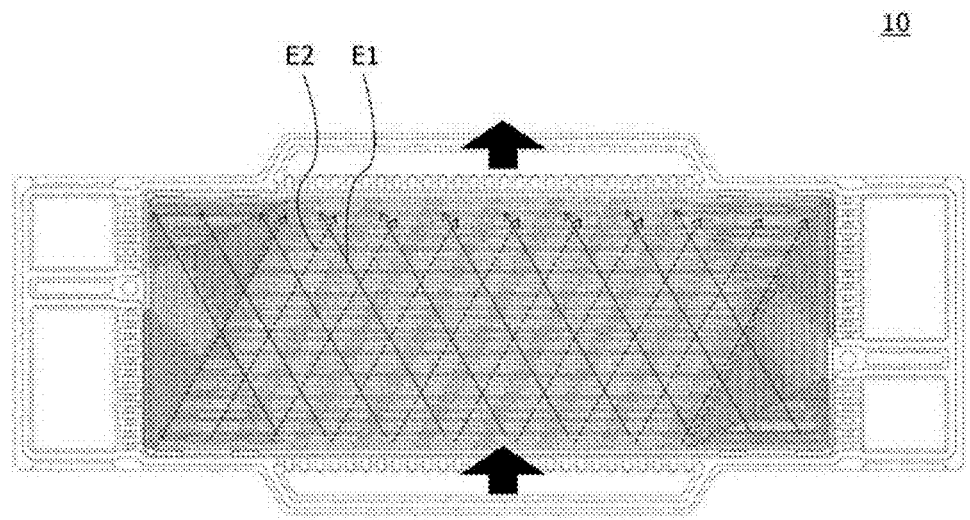
[Figure 11]
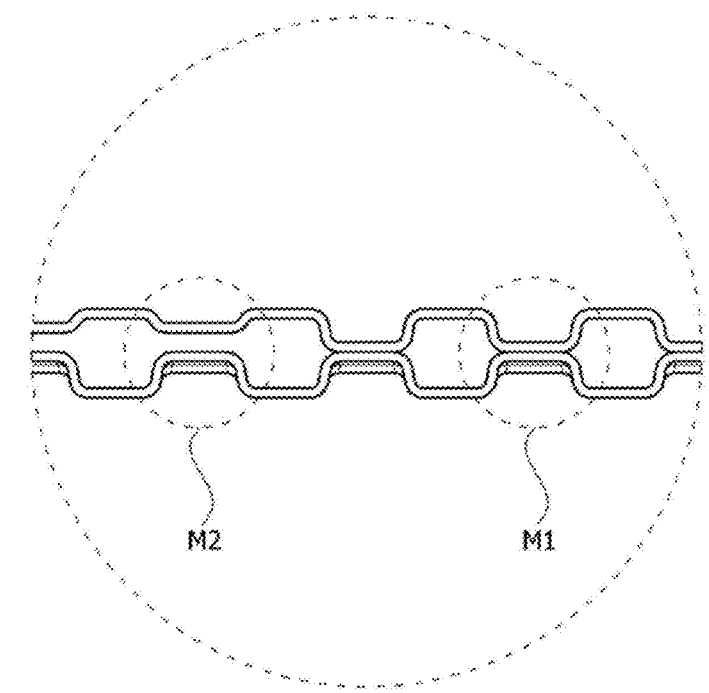

[Figure 12]
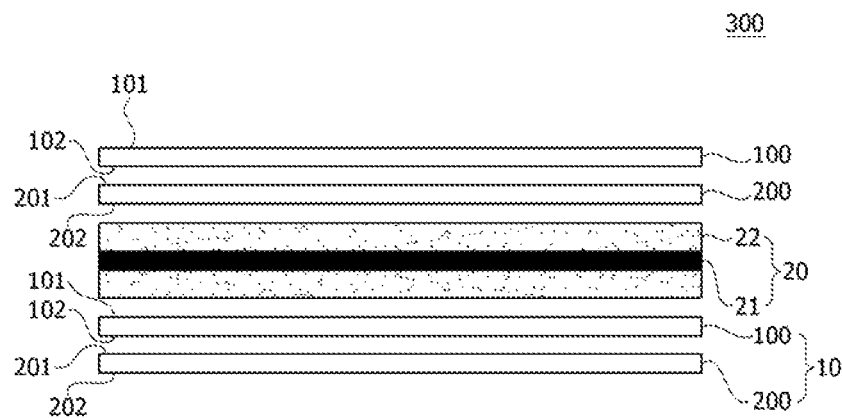
[Figure 13]
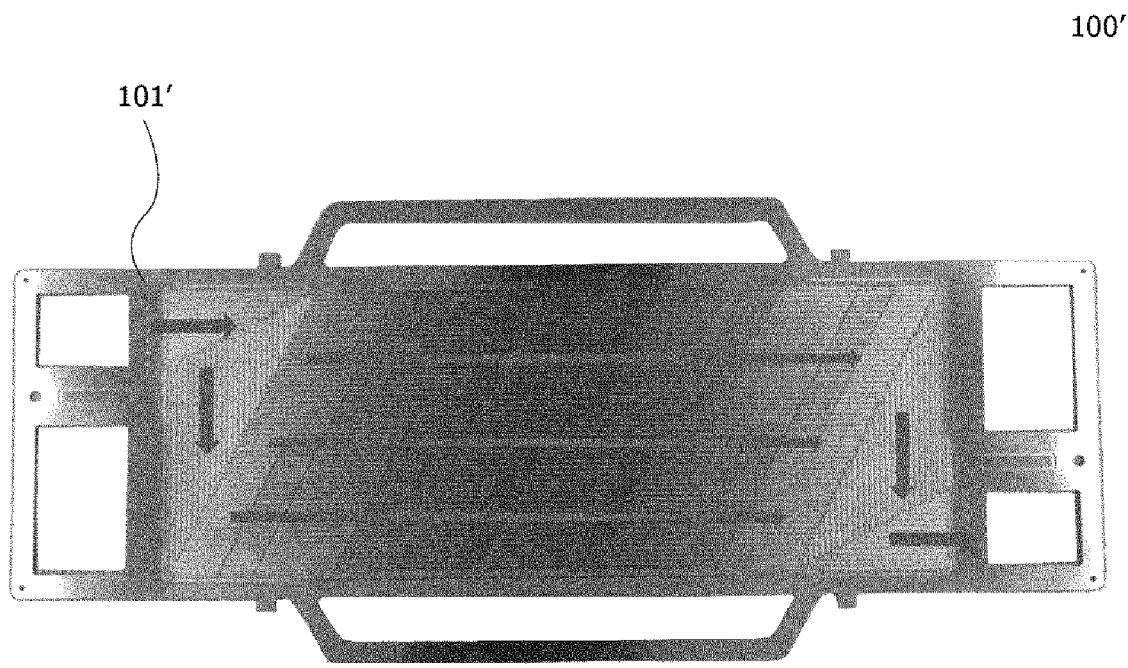

[Figure 14]
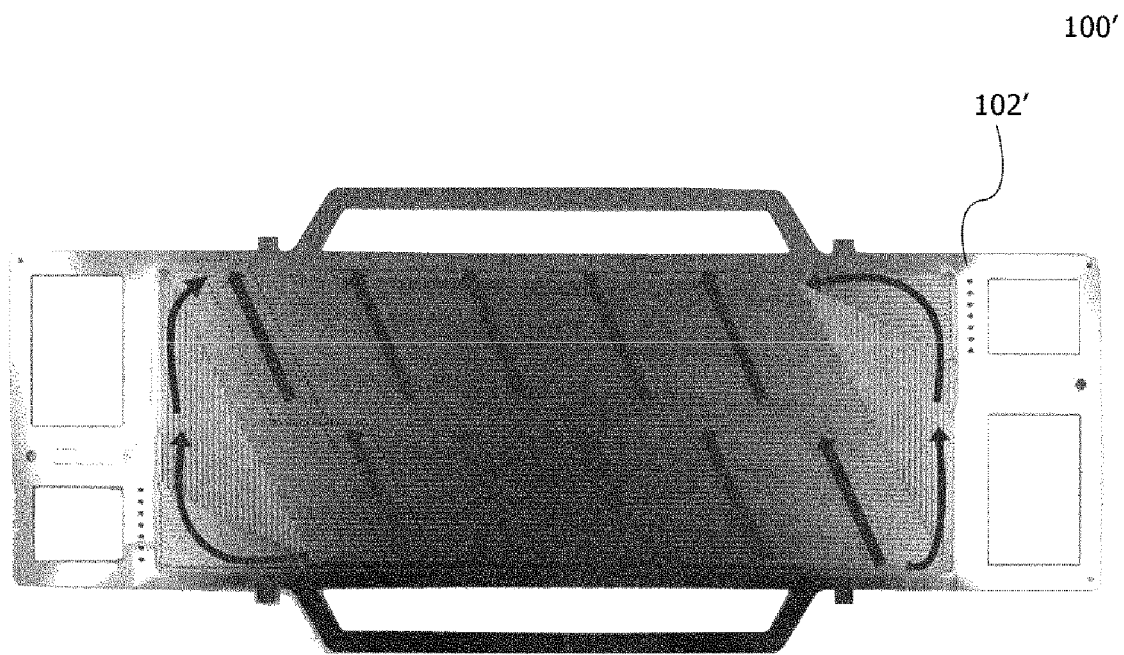
[Figure 15]
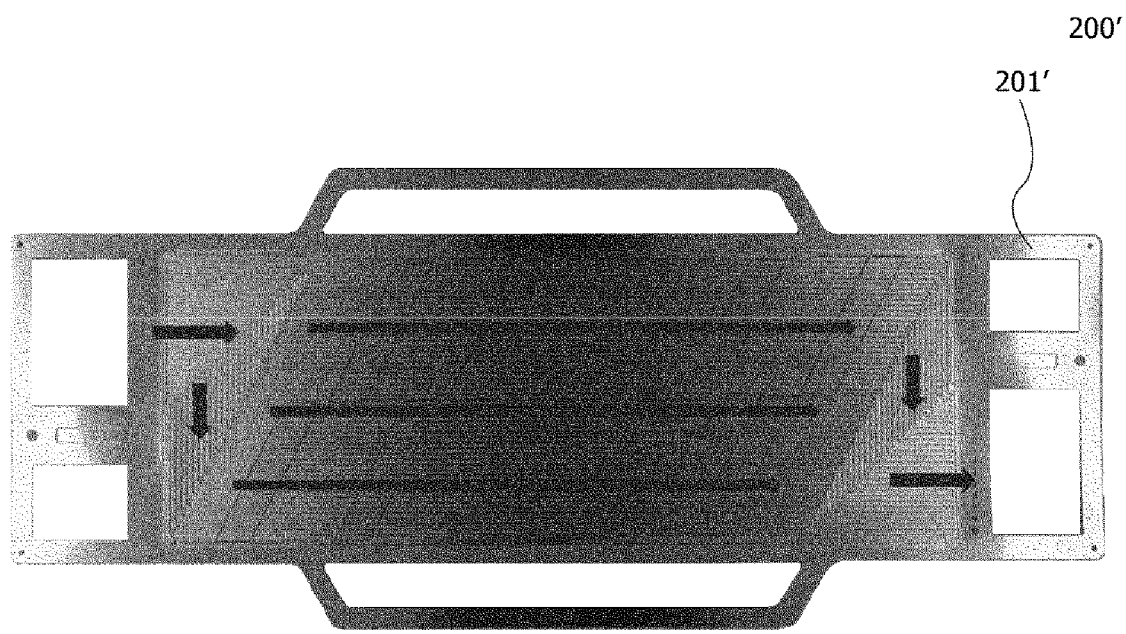

[Figure 16]
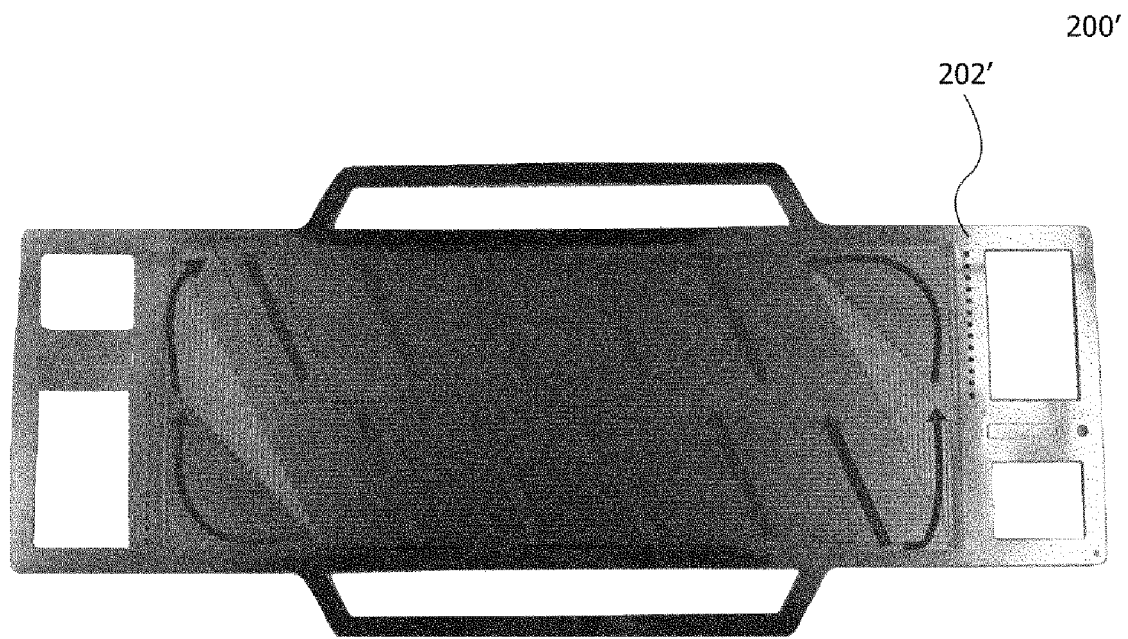

SEPARATING PLATE AND FUEL CELL STACK INCLUDING SAME

TECHNICAL FIELD

The present invention relates to a separating plate and a fuel cell stack including the same.

The present application claims the benefit of priority based on Korean Patent Application No. 10-2015-0073872, filed on May 27, 2015, the disclosure of which is incorporated herein by reference in its entirety.

BACKGROUND ART

Generally, a fuel cell system may include a fuel cell stack, and a fuel supply part for supplying fuel containing hydrogen to the fuel cell stack and an air supply part for supplying an oxidant containing oxygen necessary for an electrochemical reaction of the fuel cell stack. The fuel cell system having the above structure generates electrical energy by the electrochemical reaction between fuel and air, and discharges heat and water as by-products of the reaction.

The fuel cell stack is formed by successively arranging the separating plates, where the separating plates may be each disposed on both sides of a membrane-electrode assembly (MEA) with the membrane-electrode assembly interposed.

The separating plate may include a pair of metal plates, and the separating plate is provided with a hydrogen passage and an air passage for supplying fuel and air to the membrane-electrode assembly, respectively, and a coolant passage for allowing a cooling medium (for example, cooling water) to flow. At this time, the coolant passage may be provided so that the cooling medium flows into the space between the pair of plates.

On the other hand, as the coolant passage is dependently formed for the hydrogen passage (anode passage) and the air passage (cathode passage), the conventionally stamping-molded metal separating plate has a problem that it is difficult to uniformly supply the cooling water over the reaction surface due to the design limitation. Particularly, when the cooling water is not uniformly supplied over the reaction surface, there is a problem that the temperature control of the reaction surface becomes non-uniform and the performance and durability of the fuel cell deteriorate.

DISCLOSURE

Technical Problem

It is a problem to be solved by the present invention to provide a separating plate capable of uniformly supplying cooling water over a reaction region of the separating plate, and a fuel cell stack comprising the same.

In addition, it is a problem to be solved by the present invention to provide a separating plate capable of reducing diffusion resistance of a reaction gas and a fuel cell stack comprising the same.

Furthermore, it is a problem to be solved by the present invention to provide a separating plate capable of improving performance and durability and a fuel cell stack comprising the same.

Technical Solution

To solve the above problems, according to one aspect of the present invention, there is provided a separating plate comprising a first plate having a first surface and a second surface in the opposite direction of the first surface and having a plurality of first channels protruding from the first surface toward the second surface to provide flow spaces for a first fluid and provided to have linear passages along the longitudinal direction; and a second plate having a first surface facing the second surface of the first plate and a second surface in the opposite direction of the first surface and having a plurality of second channels protruding from the second surface toward the first surface to provide flow spaces for a second fluid and provided to have linear passages along the longitudinal direction.

In addition, the first plate has a plurality of third channels provided on one surface of the first channels facing the first surface of the second plate so as to provide flow spaces for a third fluid in a space between the first plate and the second plate.

Furthermore, the second plate has a plurality of fourth channels provided on one surface of the second channels facing the second surface of the first plate to provide flow spaces for the third fluid in a space between the first plate and the second plate.

Furthermore, the first plate and the second plate are coupled such that a virtual first line segment connecting centers of the third channels adjacent along the width direction and a virtual second line segment connecting centers of the fourth channels adjacent in the width direction intersect in some areas.

According to another aspect of the present invention, there is provided a separating plate comprising a first plate having a first surface and a second surface in the opposite direction of the first surface and having a plurality of first channels protruding from the first surface toward the second surface to provide flow spaces for a first fluid and provided to have linear passages along the longitudinal direction; and a second plate having a first surface facing the second surface of the first plate and a second surface in the opposite direction of the first surface and having a plurality of second channels protruding from the second surface toward the first surface to provide flow spaces for a second fluid.

In addition, the first plate has a plurality of third channels provided on one surface of the first channels facing the first surface of the second plate so as to provide flow spaces for a third fluid in a space between the first plate and the second plate.

Furthermore, the first plate is provided so that a virtual first line segment connecting centers of at least two third channels adjacent along the width direction is inclined with respect to the width direction.

Also, according to another aspect of the present invention, there is provided a fuel cell stack comprising a membrane-electrode assembly and the separating plate.

Advantageous Effects

As described above, the separating plate related to one embodiment of the present invention and the fuel cell stack comprising the same have the following effects.

A fuel passage and an air passage having a stepped structure provided to have different depths of the channel are formed on the linear passage in each of the plates (anode and cathode separating plates) constituting the separating plate. Particularly, in designing the shape of the anode/cathode side reaction gas molded passage, a height step is formed in the horizontal passage section having fully developed laminar flow characteristics. Accordingly, the reaction gas flow has the same characteristics as the wave-like flow by different levels within the reaction gas horizontal passage. Also, a mass transfer coefficient can be increased by disturbance of a velocity boundary layer. In addition, it is possible to form a local convection flow inside a gas diffusion layer (GDL) adjacent to the stepped section and inside the electrode. Furthermore, the diffusion resistance of the reaction gas is reduced, so that the transfer of the reaction gas can be promoted, and the discharge of the condensed water becomes easy. Thus, the performance and durability of the fuel cell stack is improved. Particularly, it is effective for improving performance degradation due to a lack of the reaction gas generated in high current region and accumulation of the condensed water.

In addition, coolant passages are formed, which are capable of supplying uniform cooling water and recovering heat across all areas of the reaction region. Therefore, it is possible to easily regulate the temperature of the reaction surface and to prevent performance and durability due to thermal load from being reduced.

BRIEF DESCRIPTION OF DRAWINGS

FIG. 1 is a plan view showing a first surface of a first plate constituting a separating plate related to one embodiment of the present invention.

FIG. 2 is a perspective view of the first plate depicted in FIG. 1.

FIG. 3 is a plan view showing a second surface of a first plate constituting a separating plate related to one embodiment of the present invention.

FIG. 4 is a perspective view of the first plate depicted in FIG. 3.

FIG. 5 is a plan view showing a second surface of a second plate constituting a separating plate related to one embodiment of the present invention.

FIG. 6 is a perspective view of the second plate depicted in FIG. 5.

FIG. 7 is a plan view showing a first surface of a second plate constituting a separating plate related to one embodiment of the present invention.

FIG. 8 is a perspective view of the second plate depicted in FIG. 7.

FIG. 9 is a conceptual diagram for explaining a coupling state of a separating plate related to one embodiment of the present invention.

FIG. 10 is a conceptual diagram for explaining cooling water flow of a separating plate related to one embodiment of the present invention.

FIG. 11 is a cross-sectional view of the separating plate depicted in FIG. 10.

FIG. 12 is a schematic cross-sectional view of a fuel cell stack related to one embodiment of the present invention.

FIGS. 13 to 16 are photographs of plates constituting a separating plate related to another embodiment of the present invention.

MODE FOR INVENTION

Hereinafter, a separating plate according to one embodiment of the present invention and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a plan view showing a first surface (101) of a first plate (100) constituting a separating plate related to one embodiment of the present invention, FIG. 2 is a perspective view of the first plate (100) depicted in FIG. 1, FIG. 3 is a plan view showing a second surface (102) of the first plate (100) constituting a separating plate related to one embodiment of the present invention, and FIG. 4 is a plan view of the first plate (100) depicted in FIG. 3.

In addition, FIG. 5 is a plan view showing a second surface (201) of a second plate (200) constituting a separating plate related to one embodiment of the present invention, FIG. 6 is a perspective view of a second plate (200) depicted in FIG. 5, FIG. 7 is a plan view showing a first surface (202) of a second plate (200) constituting a separating plate related to one embodiment of the present invention, and FIG. 8 is a perspective view of the second plate (200) depicted in FIG. 7.

FIG. 9 is a conceptual view for explaining a coupling state of a separating plate related to one embodiment of the present invention, FIG. 10 is a conceptual view for explaining cooling water flow of a separating plate (10) related to one embodiment of the present invention, FIG. 11 is a cross-sectional view of the separating plate depicted in FIG. 10, and FIG. 12 is a schematic cross-sectional view of the fuel cell stack (300) related to one embodiment of the present invention.

The fuel cell system related to one embodiment of the present invention comprises a fuel cell stack (300, see FIG. 12). In addition, the fuel cell stack (300) comprises a membrane-electrode assembly (20) and at least one separating plate (10). The membrane-electrode assembly (20) may comprise an electrolyte membrane (21) and a gas diffusion layer (22). Furthermore, a catalyst for forming anode and cathode electrodes may be provided on both sides of the electrolyte membrane (21).

The separating plate (10) comprises a first plate (100).

Referring to FIGS. 1 and 2, the first plate (100) has a first surface (101) and a second surface (102) in the opposite direction of the first surface (101). The first plate (100) also has a plurality of first channels (130) protruding from the first surface (101) toward the second surface (102) to provide flow spaces for a first fluid. The first channels (130) are each extended along the longitudinal direction (y-axis direction in FIG. 1) of the first plate (100). The plurality of first channels (130) is provided to have a linear passage along the longitudinal direction of the first plate (100), respectively.

In addition, the first plate (100) is provided with a supply manifold (110) and a collection manifold (120), connected to the plurality of first channels (130). The first surface (101) of the first plate (100) is also provided with a supply passage (A1) and a distribution passage (B1) and a linear passage (C1) in order along the direction from the supply manifold (110) toward the collection manifold (120). At this time, the supply passage (A1) is provided on the side of the supply manifold (110), and the linear passage (C1) is provided in the center of the first plate (100).

Referring to FIG. 2, the first channel (130) is provided to have different channel depths in the linear passage (C1) along the longitudinal direction. Specifically, the first channel (130) may comprise a first region (140) having a first depth and a second region (150) having a second depth less than the first depth. In addition, the first region (140) and the second region (150) may be alternately arranged along the longitudinal direction of the first plate in the linear passage (C1). Furthermore, as the first region (140) and the second region (150) having the depth difference are alternately provided, the first channel (130) has a stepped structure in the linear passage (C1).

The boundary region between the first region (140) and the second region (150) may be provided to form an upward flow or a downward flow of the first fluid flowing through the first channel (130). In particular, in the fuel cell stack (300), the first plate (100) is disposed so that the first surface (101) faces one surface of the membrane-electrode assembly (20). That is, the first channel (130) is opened toward the first surface (101), that is, the gas diffusion layer (22). Furthermore, the upward flow of the first fluid means a flow in which the rise is formed toward the gas diffusion layer (22).

Besides, the ratio of the entire length of the second region (150) to the entire length of the linear passage (C1) in the first channel (130) can be determined in consideration of a pressure loss and an average flow rate of a parallel passage section. For example, when the first fluid is a fuel (hydrogen), the ratio of the entire length of the second region (150) to the entire length of the linear passage in the first channel (130) may be formed to be less than 70%. Otherwise, when the first fluid is air (oxidant), the ratio of the entire length of the second region (150) to the entire length of the linear passage in the first channel (130) may be formed to be less than 30%. Also, the width of the first channel (130) may be kept constant along the longitudinal direction.

A virtual line segment (L1) connecting centers of the second regions (150) in the first channels (130) adjacent along the width direction (x-axis direction) of the first plate (100) may be provided to be inclined with regard to the width direction of the first plate (100). In addition, the virtual line segment (L1) connecting centers of the second regions (150) in the first channels (130) adjacent along the width direction of the first plate (100) may be provided to be parallel with the width direction of the first plate (100). Specifically, the virtual line segment (L1) connecting centers of the second regions (150) of at least two first channels (130) adjacent along the width direction (x-axis direction) of the first plate (100) may be also provided so as to be inclined with respect to the width direction of the first plate (100), or may be provided to be parallel with the width direction.

On the other hand, the separating plate (10) comprises a second plate (200).

Referring to FIGS. 5 and 6, the second plate (200) has a first surface (202) facing the second surface (102) of the first plate (100) and a second surface (201) in the opposite direction of the first surface (202). In addition, the second plate (200) has a plurality of second channels (230) protruding from the second surface (201) toward the first surface (202) to provide flow spaces for a second fluid. The second channels (230) are each extended along the longitudinal direction of the second plate (200) (the same as the longitudinal direction of the first plate). The plurality of second channels (230) is provided to have a linear passage along the longitudinal direction of the second plate (200), respectively.

In addition, the second plate (200) is provided with a supply manifold (210) and a collection manifold (220), connected to the plurality of second channels (230). The second surface (201) of the second plate (200) is also provided with a supply passage (A2) and a distribution passage (B2) and a linear passage (C2) in order along the direction from the supply manifold (210) toward the collection manifold (220). At this time, the supply passage (A2) is provided on the side of the supply manifold (210), and the linear passage (C2) is provided in the center of the second plate (200).

Referring to FIG. 6, the second channel (230) is provided to have different channel depths in the linear passage (C2) along the longitudinal direction. Specifically, the second channel (230) may comprise a first region (240) having a first depth and a second region (250) having a second depth less than the first depth. In addition, the first region (240) and the second region (250) may be alternately arranged along the longitudinal direction of the second plate in the linear passage (C2). Furthermore, as the first region (240) and the second region (250) having the depth difference are alternately provided, the second channel (230) has a stepped structure in the linear passage (C2).

The boundary region between the first region (240) and the second region (250) may be provided to form an upward flow or a downward flow of the second fluid flowing through the second channel (230). In particular, in the fuel cell stack (300), the second plate (200) is disposed so that the second surface (201) faces one surface of the membrane-electrode assembly (20). That is, the second channel (230) is opened toward the second surface (201), that is, the gas diffusion layer (22). Furthermore, the upward flow of the second fluid means a flow in which the rise is formed toward the gas diffusion layer (22).

As described above, the ratio of the entire length of the second region (150) to the entire length of the linear passages (C1, C2) in the first channel (130) and the second channel (230) can be determined in consideration of the pressure loss and the average flow rate of parallel passage sections. For example, the first fluid may be a fuel and the second fluid may be an oxidant. Here, when the first fluid is a fuel (hydrogen), the ratio of the entire length of the second region (150) to the entire length of the linear passage in the first channel (130) may be formed to be less than 70%. When the second fluid is air (oxidant), the ratio of the entire length of the second region (250) to the entire length of the linear passage in the second channel (230) may be formed to be less than 30%. Also, the width of the second channel (230) may be kept constant along the longitudinal direction.

A virtual line segment (L2) connecting centers of the second regions (250) in the second channels (230) adjacent along the width direction (x-axis direction) of the second plate (200) may be provided to be inclined with regard to the width direction of the second plate (200). In addition, the virtual line segment (L2) connecting centers of the second regions (250) in the second channels (230) adjacent along the width direction of the second plate (200) may be provided to be parallel with the width direction of the second plate (200). Specifically, the virtual line segment (L2) connecting centers of the second regions (250) of at least two second channels (230) adjacent along the width direction (x-axis direction) of the second plate (200) may be also provided so as to be inclined with respect to the width direction of the second plate (200), or may be provided to be parallel with the width direction.

Meanwhile, the first plate (100) and the second plate (200) may be coupled through a gasket provided on the edge for sealing. Referring to FIG. 9, the first plate (100) and the second plate (200) can be coupled such that the second surface (102) of the first plate (100) and the first surface (202) of the second plate (200) face each other. This structure may be provided, between the second surface (102) of the first plate (100) and the first surface (202) of the second plate (200), so that a third fluid flows into the space between the first channel (130) and the second channel (230). Furthermore, the third fluid may be provided to flow along the width direction of the first and second plates (100, 200), which will be described below.

Meanwhile, the first and second channels (130, 230) are each provided to have different channel depths along the longitudinal direction in the linear passages (C1, C2). In addition, the first plate (100) and the second plate (200) may be coupled such that the first channel (130) and the second channel (230) are in contact with each other in some areas and the first channel (130) and the second channel (230) are not in contact with each other in the remaining areas. Referring to FIG. 11, the first plate (100) and the second plate (200) are coupled such that the lower surface of the first channel (130) and the lower surface of the second channel (230) are in contact with each other in some areas (M1) and the lower surface of the first channel (130) and the lower surface of the second channel (230) are not in contact with each other in the remaining areas (M2). On the other hand, the ratio of the contact area to the non-contact area can be determined in consideration of the cooling water flow to be described below.

As described above, the first plate (100) has a plurality of first channels (130) provided to have linear passages along the longitudinal direction. Referring to FIGS. 3 and 4, the first plate (100) has a plurality of third channels (160) provided on one surface (lower surface) of the first channels (130) facing the first surface (202) of the second plate (200) to provide flow spaces for a third fluid in a space between the first plate (100) and the second plate (200). The first plate (100) may be also provided such that a virtual first line segment (E1) connecting centers of at least two third channels (160) adjacent along the width direction is inclined with respect to the width direction. In addition, the first fluid may be a fuel, the second fluid may be an oxidant, and the third fluid may be cooling water. The first line segment (E1) also represents the flow direction of the third fluid, that is, the flow direction of the cooling water. Furthermore, a virtual region (D1) composed of the adjacent third channels (160) represents a first coolant passage (D1). In summary, the flow of fuel can be achieved through the first surface (101) of the first plate (100) and the flow of cooling water can be achieved through the second surface (102). Furthermore, the first plate (100) may be also provided such that a virtual first line segment connecting centers of at least two third channels (160) adjacent along the width direction is parallel with the width direction. Furthermore, the first plate (100) may be also provided such that a virtual first line segment connecting centers of the third channels (160) adjacent along the width direction is inclined with respect to the width direction in some areas, and is parallel with the width direction in some areas. Also, the plurality of third channels (160) may be provided to be spaced apart at a predetermined interval along the longitudinal direction (y-axis direction) in the linear passage (C1) of the first channel (130). That is, a plurality of first line segments (E1) may be formed along the longitudinal direction (y-axis direction) of the first plate (100).

As described above, the first channel (130) may be provided to have different channel depths along the longitudinal direction in the linear passage (C1), and the first channel (130) may comprise a first region (140) having a first depth and a second region (150) having a second depth less than the first depth. Here, the third channel (160) may be formed by the second region (150) of the first channel (130). Also, the third channel (160) may be dependently formed by the stepped structure of the first channel (130) in the first plate (100).

Meanwhile, the second plate (200) comprises a plurality of second channels (230) provided to have linear passages along the longitudinal direction. Referring to FIGS. 7 and 8, the second plate (200) has a plurality of fourth channels (260) provided on one surface (lower surface) of the second channels (230) facing the second surface (102) of the first plate (100) to provide flow spaces for a third fluid in a space between the first plate (100) and a second plate (200). Referring to FIG. 10, the first plate (100) and the second plate (200) are coupled such that a virtual first line segment (E1) connecting centers of the third channels (160) adjacent along the width direction and a virtual second line segment (E2) connecting centers of the fourth channels (260) adjacent along, the width direction intersect in some areas.

The second line segment (E2) also represents the flow direction of the third fluid, that is, the flow direction of the cooling water. Furthermore, a virtual region (D2) composed of the adjacent fourth channels (260) represents a second coolant passage (D2). In summary, the flow of cooling water can be achieved through the first surface (202) of the second plate (200) and the flow of the oxidant (air) can be achieved through the second surface (201). Furthermore, the second plate (200) may be also provided such that a virtual second line segment (E2) connecting centers of at least two fourth channels (260) adjacent along the width direction is parallel with the width direction. Furthermore, the second plate (200) may be also provided such that a virtual second line segment (E2) connecting centers of the fourth channels (260) adjacent along the width direction is inclined with respect to the width direction in some areas, and is parallel with the width direction in some areas. Also, the plurality of fourth channels (260) may be provided to be spaced apart at a predetermined interval along the longitudinal direction (y-axis direction) in the linear passage (C2) of the second channel (230). That is, a plurality of second line segments (E2) may be formed along the longitudinal direction (y-axis direction) of the second plate (200).

As described above, the second channel (230) may be provided to have different channel depths along the longitudinal direction in the linear passage (C2), and the second channel (230) may comprise a first region (240) having a first depth and a second region (250) having a second depth less than the first depth. Here, the fourth channel (260) may be formed by the second region (250) of the second channel (230). Also, the fourth channel (260) may be dependently formed by the stepped structure of the second channel (230) in the second plate (200).

In order that the virtual first line segment (E1) and second line segment (E2) intersect in some areas, the first plate (100) and the second plate (200) may be provided such that the first line segment (E1) and the second line segment (E2) are inclined with regard to the width direction, respectively. For example, referring to FIGS. 9 and 10, the first line segment (E1) may be provided to be inclined in a first direction (counterclockwise direction), and the second line segment (E2) may be provided to be inclined in a second direction (clockwise direction). In addition, referring to FIG. 9, the length of the third channel (160) along the longitudinal direction of the first channel (130) and the length of the fourth channel (260) along the longitudinal direction of the second channel (230) may be provide to be different from each other. This may be due to the ratio of the lengths of the first region and the second region in each of the channels (130, 230).

In addition, referring to FIGS. 9 and 10, the third fluid flowing along the first line segment (E1) direction from the first plate (100) side and the third fluid (E2) flowing along the second line segment direction from the second plate (200) side are joined and branched in the intersection areas. Specifically, the first coolant passage (D1) and the second coolant passage (D2) are provided so as to be joined and branched in the intersection areas.

FIGS. 13 to 16 are plan views of plates (100', 200') constituting a separating plate related to another embodiment of the present invention. FIGS. 13 and 14 show modification examples of the first surface (101') and the second surface (102') of the first plate (100'), respectively, and FIGS. 15 and 16 show modification examples of the second surface (201') and the first surface (202') of the second plate (200'), respectively. The arrows depicted in FIG. 13 indicate the flow direction of hydrogen, the arrows depicted in FIG. 14 indicate the flow direction of the first coolant passage, FIG. 15 shows the flow direction of air, and the arrows depicted in FIG. 16 indicate the flow direction of the second coolant passage.

Referring to FIGS. 13 to 16, each of the plates may be also provided so that a plurality of virtual line segments is formed along the width direction as well as the longitudinal direction of the first and second plates (100', 200') with regard to the first and second coolant passages.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to one embodiment of the present invention, there is provided a separating plate on which coolant passages capable of uniformly supplying cooling water and recovering heat across all areas of the reaction region are formed, wherein the separating plate can easily regulate the temperature of the reaction surface, and prevent performance and durability due to thermal load from being reduced.

The invention claimed is:

1. A separating plate, comprising:
a first plate having a first surface and a second surface in the opposite direction of the first surface and having a plurality of first channels protruding from the first surface toward the second surface to provide flow spaces for a first fluid and provided to have linear passages along a longitudinal direction extending from a first end of the first plate to a second end of the first plate; and
a second plate having a first surface facing the second surface of the first plate and a second surface in the opposite direction of the first surface and having a plurality of second channels protruding from the second surface toward the first surface to provide flow spaces for a second fluid and provided to have linear passages along the longitudinal direction, the plurality of second channels being parallel and coextensive with the plurality of first channels,
wherein the first plate has a plurality of third channels provided on one surface of the first channels facing the first surface of the second plate so as to provide flow spaces for a third fluid in a space between the first plate and the second plate,
wherein the second plate has a plurality of fourth channels provided on one surface of the second channels facing the second surface of the first plate to provide flow spaces for the third fluid in a space between the first plate and the second plate, and
wherein the first plate and the second plate are coupled such that a virtual first line segment connecting centers of the third channels adjacent along the width direction and a virtual second line segment connecting centers of the fourth channels adjacent in the width direction intersect in some areas.

2. The separating plate according to claim 1, wherein the first plate and the second plate are provided such that the first line segment and the second line segment are inclined with respect to the width direction, respectively.

3. The separating plate according to claim 2, wherein the first line segment is provided to be inclined in a first direction and the second line segment is provided to be inclined in a second direction opposite to the first direction.

4. The separating plate according to claim 1, wherein the plurality of third channels is provided to be spaced apart at a predetermined interval along the longitudinal direction in the linear passage of the first channel, and
the plurality of fourth channels is provided to be spaced apart at a predetermined interval along the longitudinal direction in the linear passage of the second channel.

5. The separating plate according to claim 4, wherein the length of the third channel along the longitudinal direction of the first channel and the length of the fourth channel along the longitudinal direction of the second channel are provided to be different from each other.

6. The separating plate according to claim 1, wherein the first channel and the second channel are each provided to have different channel depths along the longitudinal direction in the linear passage,
the first channel and the second channel each comprise a first region having a first depth and a second region having a second depth less than the first depth,
the third channel is formed by the second region of the first channel, and
the fourth channel is formed by the second region of the second channel.

7. The separating plate according to claim 6, wherein the ratio of the entire length of the second region to the entire length of the linear passage in the first channel is formed to be less than 70%, and
the ratio of the entire length of the second region to the entire length of the linear passage in the second channel is formed to be less than 30%.

8. The separating plate according to claim 1, wherein the first fluid is a fuel, the second fluid is an oxidant, and the third fluid is cooling water.

9. The separating plate according to claim 1, wherein the first plate and the second plate are coupled such that the first channel and the second channel are in contact with each other in some areas and the first channel and the second channel are not in contact with each other in the remaining areas.

10. The separating plate according to claim 1, wherein the third fluid flowing along the first line segment direction from the first plate side and the third fluid flowing along the second line segment direction from the second plate side are joined and branched in the intersection areas.

11. A fuel cell stack comprising a membrane-electrode assembly; and
the separating plate according to claim 1.

12. A separating plate comprising
a first plate having a first surface and a second surface in the opposite direction of the first surface and having a plurality of first channels protruding from the first surface toward the second surface to provide flow spaces for a first fluid and provided to have linear passages along the longitudinal direction; and a second plate having a first surface facing the second surface of the first plate and a second surface in the opposite direction of the first surface and having a plurality of second channels protruding from the second surface toward the first surface to provide flow spaces for a second fluid, wherein the first plate has a plurality of third channels provided on one surface of the first channels facing the first surface of the second plate so as to provide flow spaces for a third fluid in a space between the first plate and the second plate, wherein the first plate is provided so that a virtual first line segment connecting centers of at least two third channels adjacent along the width direction is inclined or parallel with respect to the width direction, wherein the first channel is provided to have different channel depths along the longitudinal direction in the linear passage, the first channel comprises a first region having a first depth and a second region having a second depth less than the first depth, and the third channel is formed by the second region of the first channel.

13. The separating plate according to claim 12, wherein the first plate is provided so that a virtual first line segment connecting centers of at least two third channels adjacent along the width direction is parallel with the width direction.

14. The separating plate according to claim 12, wherein the plurality of third channels is provided to be spaced apart at a predetermined interval along the longitudinal direction in the linear passage of the first channel.

15. The separating plate according to claim 12, wherein the boundary region between the first region and the second region is provided to form an upward flow or a downward flow of the first fluid flowing through the first channel.

16. The separating plate according to claim 12, wherein the ratio of the entire length of the second region to the entire length of the linear passage in the first channel is formed to be less than 70%.

17. The separating plate according to claim 12, wherein the first fluid is a fuel, the second fluid is an oxidant, and the third fluid is cooling water.

18. The separating plate according to claim 12, wherein the first plate and the second plate are coupled through a gasket provided at the edge.

19. A fuel cell stack comprising a membrane-electrode assembly; and
the separating plate according to claim 12.

* * * * *